(12) United States Patent
Zhou

(10) Patent No.: US 10,055,564 B2
(45) Date of Patent: Aug. 21, 2018

(54) BIOMETRIC AUTHENTICATION, AND NEAR-EYE WEARABLE DEVICE

(71) Applicant: Beijing Zhigu Rui Tuo Tech Co., Ltd, Beijing (CN)

(72) Inventor: Liang Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

(21) Appl. No.: 15/316,511

(22) PCT Filed: Apr. 30, 2015

(86) PCT No.: PCT/CN2015/077974
§ 371 (c)(1),
(2) Date: Dec. 5, 2016

(87) PCT Pub. No.: WO2015/184944
PCT Pub. Date: Dec. 10, 2015

(65) Prior Publication Data
US 2017/0161479 A1   Jun. 8, 2017

(30) Foreign Application Priority Data
Jun. 6, 2014 (CN) .......................... 2014 1 0250850

(51) Int. Cl.
G06F 21/32 (2013.01)
G06K 9/00 (2006.01)
G06T 7/50 (2017.01)

(52) U.S. Cl.
CPC ......... G06F 21/32 (2013.01); G06K 9/00885 (2013.01); G06T 7/50 (2017.01)

(58) Field of Classification Search
CPC ........... G06K 9/00604; G06K 9/00335; G06K 9/0061; G06K 9/00617
See application file for complete search history.

(56) References Cited

U.S. PATENT DOCUMENTS 8,571,851 B1   10/2013   Tickner et al.
8,594,374 B1   11/2013   Bozarth
(Continued)

FOREIGN PATENT DOCUMENTS

CN   103455746 A   12/2013
CN   103745142 A    4/2014
(Continued)

OTHER PUBLICATIONS

International Search Report for PCT Application No. PCT/CN2015/077974, dated Jul. 31, 2015, 4 pages.

*Primary Examiner* — Ruiping Li
(74) *Attorney, Agent, or Firm* — Amin, Turocy & Watson, LLP

(57) ABSTRACT

Biometric authentication can comprise: obtaining, in response to an access request, verification information for biometric authentication and at least one piece of depth information corresponding to at least one presentation depth of the verification information; presenting the verification information at the at least one presentation depth according to the at least one piece of depth information; obtaining verification input information in response to a verification input operation corresponding to the verification information; and comparing the verification input information with a reference verification result, to determine whether the biometric authentication succeeds. According to the embodiments of this application, verification information for biometric authentication is presented at a depth corresponding to the verification information, and whether the biometric authentication succeeds is determined by determining whether corresponding verification input information is consistent with a reference verification result, thereby improving accuracy of authentication and security of object access.

46 Claims, 10 Drawing Sheets

(56) References Cited

U.S. PATENT DOCUMENTS

| | | |
|---|---|---|
| 9,104,854 B2 | 8/2015 | Xiao et al. |
| 2012/0140993 A1 | 6/2012 | Bruso et al. |
| 2012/0291122 A1 | 11/2012 | Chow et al. |
| 2013/0044055 A1 | 2/2013 | Karmarkar et al. |
| 2014/0126782 A1 | 5/2014 | Takai et al. |
| 2014/0225820 A1* | 8/2014 | Schwesinger ........... G06F 3/011 345/156 |
| 2014/0232638 A1* | 8/2014 | Choi ....................... G06F 3/013 345/156 |
| 2015/0193107 A1* | 7/2015 | Schwesinger ......... G06F 3/0485 715/784 |

FOREIGN PATENT DOCUMENTS

| | | |
|---|---|---|
| CN | 103748593 A | 4/2014 |
| CN | 104038489 A | 9/2014 |
| WO | 2012107879 A2 | 8/2012 |

\* cited by examiner

BIOMETRIC AUTHENTICATION, AND NEAR-EYE WEARABLE DEVICE

RELATED APPLICATION

The present application is a U.S. National Stage filing under 35 U.S.C. § 371 of international patent cooperation treaty (PCT) application No. PCT/CN2015/077974, filed Apr. 30, 2015, and entitled "BIOMETRIC AUTHENTICATION, AND NEAR-EYE WEARABLE DEVICE", which claims the benefit of priority to Chinese Patent Application No. 201410250850.7, filed on Jun. 6, 2014, which applications are hereby incorporated into the present application by reference herein in their respective entireties.

TECHNICAL FIELD

This application relates to biometric authentication technologies, and for example, to a biometric authentication method and a biometric authentication apparatus.

BACKGROUND

Smart glasses may become a next mobile Internet data access platform, which, while providing users with new user experience, has some traditional Internet security issues. For example, traditional webpage administrators need to reject some access requests from machines. Different tests (for example, biometric authentication) for identifying an identity of an access initiator are thus developed, to ensure that a received request is from a human user rather than a machine or program. A common test is the Completely Automated Public Turing Test to Tell Computers and Humans Apart (CAPTCHA). Generally, the CAPTCHA displays a deformed display image that is difficult for a machine to identify, and requires a user to input a number or letter in the deformed display image, or answer a question in the deformed display image. However, with the continuous development of computer technologies, the rate of identification of the machine on the deformed display image is increasingly high, and the identification speed is increasingly fast; thus, security of the CAPTCHA needs to be further improved.

SUMMARY

An example, non-limiting objective of this application is to provide a biometric authentication solution.

According to a first example aspect, this application provides a biometric authentication method, comprising:
  obtaining, in response to an access request, verification information for biometric authentication and at least one piece of depth information corresponding to at least one presentation depth of the verification information;
  presenting the verification information at the at least one presentation depth according to the at least one piece of depth information;
  obtaining verification input information in response to a verification input operation corresponding to the verification information; and
  comparing the verification input information with a reference verification result, to determine whether the biometric authentication succeeds.

According to a second example aspect, this application provides a biometric authentication method, comprising:
  obtaining, in response to an access request, verification information for biometric authentication and at least one piece of depth information corresponding to at least one presentation depth of the verification information;
  providing to a second device with the verification information and the at least one piece of depth information;
  acquiring verification input information corresponding to the verification information; and
  comparing the verification input information with a reference verification result, to determine whether the biometric authentication succeeds.

According to a third example aspect, this application provides a biometric authentication method, comprising:
  acquiring, from a first device, verification information for biometric authentication and at least one piece of depth information corresponding to at least one presentation depth of the verification information; and
  presenting the verification information at the at least one presentation depth according to the at least one piece of depth information.

According to a fourth example aspect, this application provides a biometric authentication apparatus, comprising:
  a first information acquisition module, configured to obtain, in response to an access request, verification information for biometric authentication and at least one piece of depth information corresponding to at least one presentation depth of the verification information;
  a presentation module, configured to present the verification information at the at least one presentation depth according to the at least one piece of depth information;
  a second information acquisition module, configured to obtain verification input information in response to a verification input operation corresponding to the verification information; and
  an analysis module, configured to compare the verification input information with a reference verification result, to determine whether the biometric authentication succeeds.

According to a fifth example aspect, this application provides a near-eye wearable device, comprising the biometric authentication apparatus according to the fourth aspect.

According to a sixth example aspect, this application provides a biometric authentication apparatus, comprising:
  a first information acquisition module, configured to obtain, in response to an access request, verification information for biometric authentication and at least one piece of depth information corresponding to at least one presentation depth of the verification information;
  a communications module, configured to provide to a second device with the verification information and the at least one piece of depth information;
  a second information acquisition module, configured to acquire verification input information corresponding to the verification information; and
  an analysis module, configured to compare the verification input information with a reference verification result, to determine whether the biometric authentication succeeds.

According to a seventh example aspect, this application provides a biometric authentication apparatus, comprising:
  a communications module, configured to acquire, from a first device, verification information for biometric authentication and at least one piece of depth information corresponding to at least one presentation depth of the verification information; and
  a presentation module, configured to present the verification information at the at least one presentation depth according to the at least one piece of depth information.

According to an eighth example aspect, this application provides a near-eye wearable device, comprising the biometric authentication apparatus according to the seventh aspect.

According to at least one example embodiment of this application, verification information for biometric authentication is presented at a depth corresponding to the verification information, and whether the biometric authentication succeeds is determined by determining whether corresponding verification input information is consistent with a reference verification result, thereby improving security of authentication.

DETAILED DESCRIPTION

Figure 1:
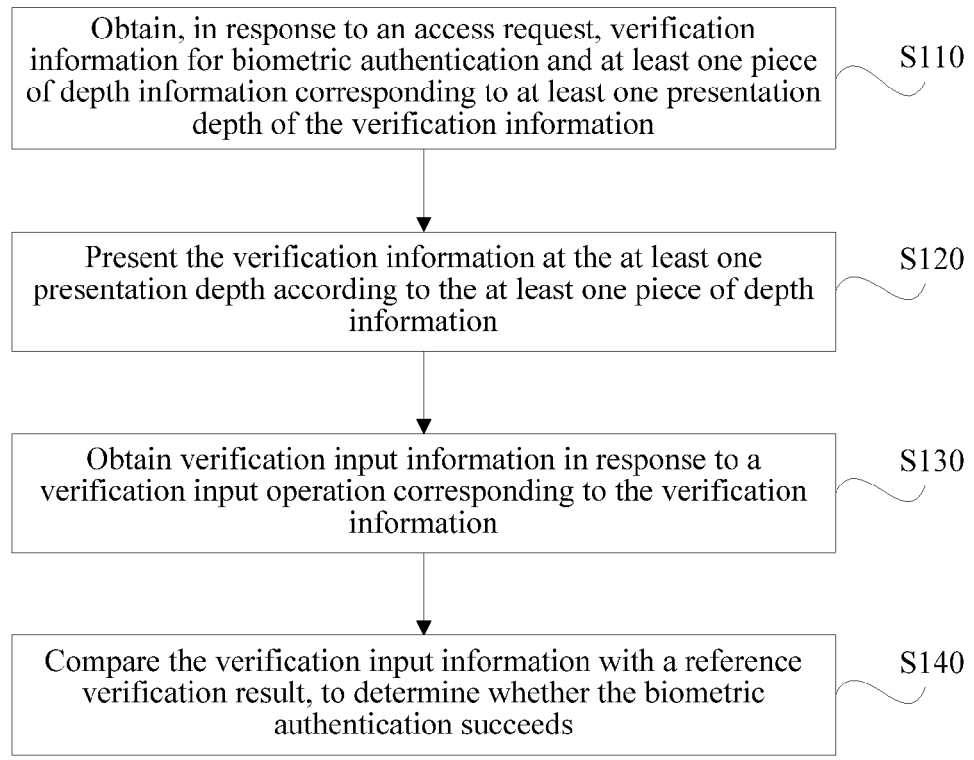
FIG. 1 is a schematic flowchart of a biometric authentication method according to an example embodiment of this application.

Example embodiments of this application are described in detail hereinafter with reference to the accompanying drawings (same elements are indicated by same reference numerals in the accompanying drawings) and embodiments. The following embodiments are intended to describe this application, but not to limit the scope of this application.

It should be understood by those skilled in the art that the terms such as "first" and "second" are merely intended to distinguish different steps, devices or modules, or the like, which neither represent any particular technical meaning nor indicate a necessary logical sequence between them.

In order to determine whether an access request for an object (for example, an access request for a webpage) is initiated by a human user or a machine, it is necessary to perform biometric authentication for the access request. Access to the corresponding object can be continued only if the biometric authentication succeeds, which means the access request is considered to be initiated by a human user, and otherwise, the access request is considered to be initiated by a machine or other non-human users, and the access is rejected, to ensure security of object access.

As shown in FIG. 1, an embodiment of this application provides a biometric authentication method, comprising:
  S110: Obtain, in response to an access request, verification information for biometric authentication and at least one piece of depth information corresponding to at least one presentation depth of the verification information.
  S120: Present the verification information at the at least one presentation depth according to the at least one piece of depth information.
  S130: Obtain verification input information in response to a verification input operation corresponding to the verification information.
  S140: Compare the verification input information with a reference verification result, to determine whether the biometric authentication succeeds.

In this embodiment, the at least one presentation depth is at least one depth of at least one presentation position of the verification information relative to a reference position; the reference position herein may be a viewing position, for example, an eye of a user; or may be a position of a presentation component, for example, a position of a lens of smart glasses. This embodiment of this application is described below by using an example that the reference position is an eye of a user.

For example, a first biometric authentication apparatus provided in this application serves as an execution body in this embodiment, to perform S110 to S140. Specifically, the first biometric authentication apparatus may be disposed in a user equipment through software, hardware or a combination thereof, or the first biometric authentication apparatus is the user equipment; the user equipment comprises, but is not limited to: smart glasses, a smart helmet and other near-eye presentation devices as well as a mobile phone, a computer and other devices, wherein the smart glasses comprise smart frame glasses and smart contact lenses. In this embodiment of this application, the user is a user of the user equipment, for example, when the user equipment is smart glasses, the user is a user wearing the smart glasses.

According to this embodiment of this application, verification information for biometric authentication is presented at a depth corresponding to the verification information, and whether the biometric authentication succeeds is determined by determining whether corresponding verification input information is consistent with a reference verification result, thereby improving accuracy of authentication and security of object access.

Figure 2:
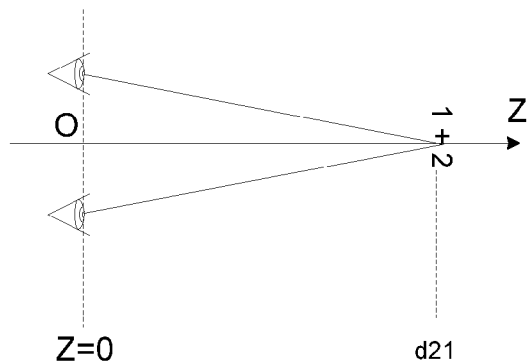
FIG. 2 is a schematic diagram showing that presentation depths of verification information in a biometric authentication method are identical according to an example embodiment of this application.

In one example embodiment of this application, as shown in FIG. 2, verification information "1+2" may be presented at a same presentation depth d21 as a whole. At this time, the at least one piece of depth information is one piece of depth information.

Figure 3:
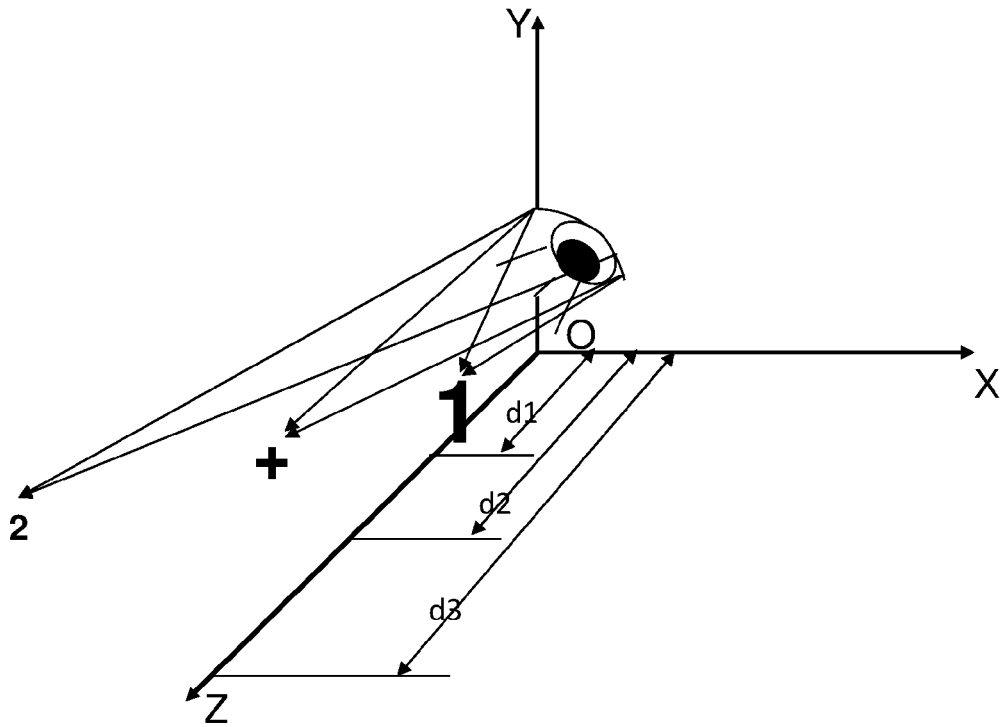
FIG. 3 is a schematic diagram showing that near-eye presentation depths of a plurality of image elements in verification information in a biometric authentication method are different according to an example embodiment of this application.

Alternatively, in another example embodiment of this application, the verification information may comprise a plurality of image elements, wherein a presentation depth corresponding to at least one image element is different from presentation depths corresponding to other image element(s). As shown in FIG. 3, the plurality of image elements corresponds to a plurality of presentation depths. At this time, the at least one piece of depth information is a plurality of pieces of depth information corresponding to a plurality of presentation depths.

Steps of the two example embodiments of the method in this embodiment of this application are further described below respectively.

Figure 4:
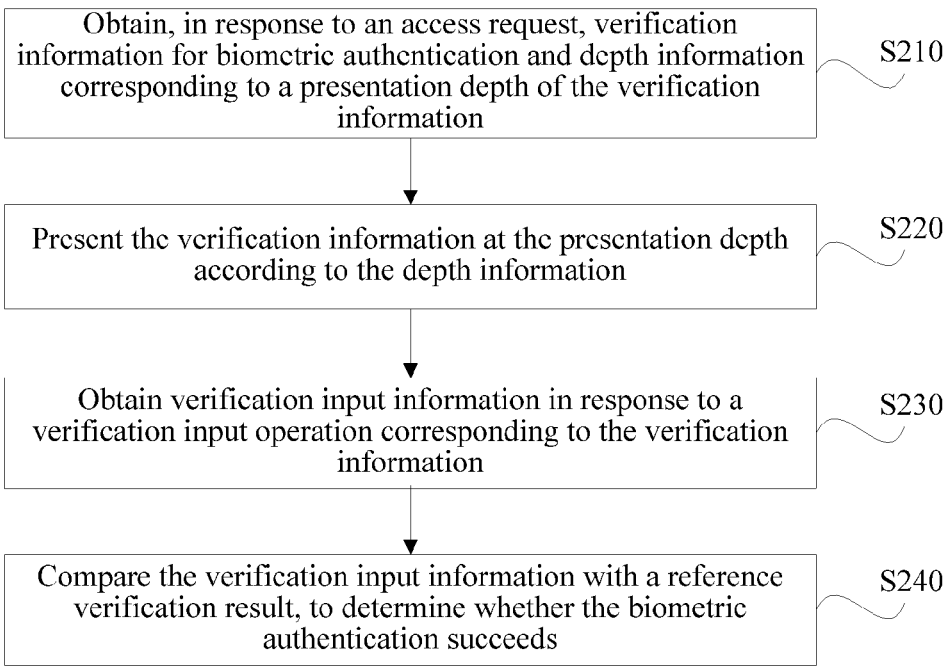
FIG. 4 is a schematic flowchart of a biometric authentication method according to an example embodiment of this application.

As shown in FIG. 4, when the verification information is presented at a same presentation depth, the method comprises:

S210: Obtain, in response to an access request, verification information for biometric authentication and depth information corresponding to a presentation depth of the verification information.

In this embodiment of this application, the verification information may comprise: a word or number with a meaning, or a pattern with no particular meaning, as long as it can be presented and seen by a user. The verification information may be obtained from an external server, for example, when the access request is an access request for a webpage, the verification information can be acquired from a server corresponding to the webpage.

In this embodiment of this application, in order to improve security of biometric authentication, depth information respectively corresponding to a plurality of verification information corresponding to a plurality of access requests should not be exactly the same. Therefore, in this example embodiment, the obtaining depth information comprises:

determining the depth information according to a set policy.

The set policy herein may be set as required, for example, depth information corresponding to verification information generated at a time is that obtained by adding a corresponding value to or subtracting a corresponding value from a presentation depth corresponding to depth information corresponding to previous verification information. For example, if the depth information corresponding to the previous verification information corresponds to a presentation depth of 1 m, depth information corresponding to current verification information corresponds to a presentation depth of 1 m+1 m, and depth information corresponding to next verification information corresponds to a presentation depth of 2 m+1 m. Certainly, a distance range may be determined for the presentation depth according to a presentation capability of a presentation device, a comfortable viewing distance of an eye of a user and other factors.

In one example embodiment, the set policy may be random within a set range. The set range may be a depth information library comprising lots of different depth information, and depth information corresponding to verification information at a time may be randomly selected from the depth information library.

S220: Present the verification information at the presentation depth according to the depth information.

For example, when the depth information is 1 m, the verification information is presented at a presentation depth of 1 m relative to an eye of a user.

In this embodiment of this application, the presentation may be represented as presentation of a presentation depth of a presented object.

In one example embodiment, the presentation is near-eye presentation. That is, in this embodiment of this application, the verification information is presented through near-eye presentation. The near-eye presentation is presenting an image to an eye through display or projection near the eye. For example, the near-eye presentation is implemented by using a Google Glass or other near-eye projection devices, wherein corresponding verification information can be presented at a set presentation depth by adjusting an optical path parameter of an optical path between a projector and an eye.

S230: Obtain verification input information in response to a verification input operation corresponding to the verification information.

In this embodiment of this application, after the verification information is presented at the presentation depth, if the access request is initiated by a user, the user sees the verification information presented at the corresponding presentation depth and performs input corresponding to the verification information. The verification input operation herein corresponding to the verification information may be: an input operation on a verification input interface corresponding to the verification information. For example, a corresponding character is input into an input box corresponding to the verification information, or a corresponding optional result is selected from several optional results of the verification information by using a mouse, a touch screen, an eye control or other means. After the user performs the input operation, corresponding verification input information is generated by using the verification input interface. However, if the access request is initiated by a machine program, the machine program may simulate the user to perform a corresponding verification input operation, and verification input information may also be obtained.

S240: Compare the verification input information with a reference verification result, to determine whether the biometric authentication succeeds.

In this embodiment of this application, the verification information may be a simple arithmetic question or a recognition question, the user can obtain a corresponding answer according to the verification information, the verification input operation is generally used to input the answer, and the verification input information is related to the answer input by the user. In this embodiment of this application, the verification input information is compared with the reference verification result to determine whether the answer input by the user is the same as the reference verification result, if yes, it is determined that the biometric authentication succeeds, and otherwise, it is determined that the biometric authentication fails.

As shown in FIG. 2, the answer corresponding to the verification information should be "3". Therefore, in the corresponding embodiment, the reference verification result is "3", and if the answer corresponding to the verification input information is not "3", in step S240, during comparison, it is considered that the biometric authentication fails.

Figure 5:
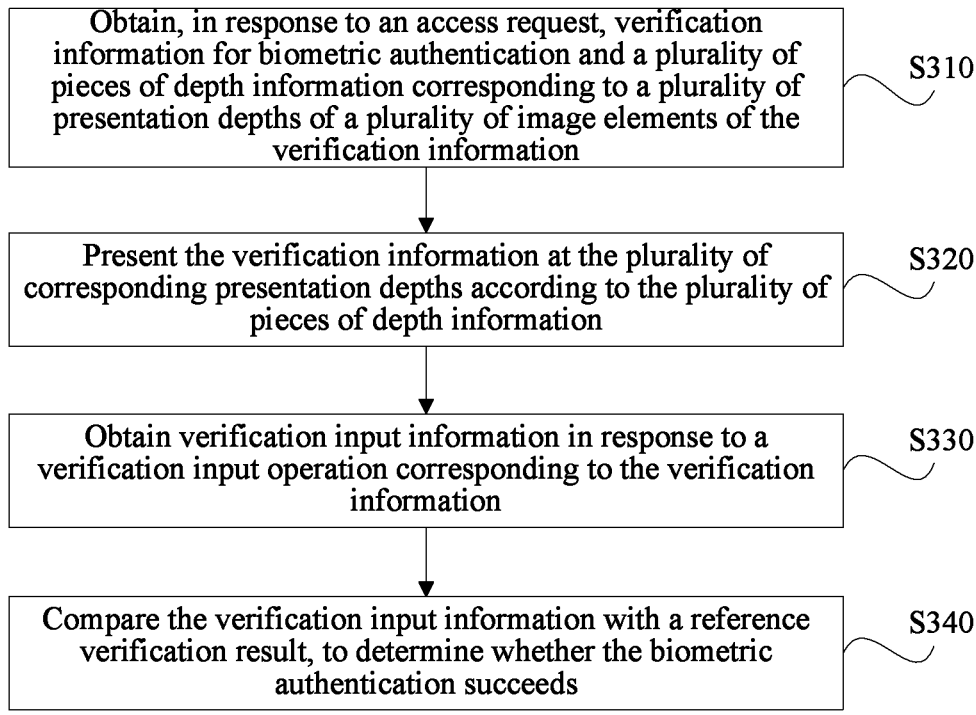
FIG. 5 is a schematic flowchart of a biometric authentication method according to an example embodiment of this application.

As shown in FIG. 5, in another embodiment of this application, when the verification information may comprise a plurality of image elements, the method comprises:

S310: Obtain, in response to an access request, verification information for biometric authentication and a plurality of pieces of depth information corresponding to a plurality of presentation depths of a plurality of image elements of the verification information.

As shown in FIG. 3, in one example embodiment, in the plurality of image elements, a presentation depth of each image element is different from that of another image element. Certainly, in other example embodiments of this embodiment of this application, presentation depths of some image elements may be the same.

Similar to the embodiment shown in FIG. 4, in this embodiment of this application, the plurality of pieces of depth information may be determined according to a set policy. In one example embodiment, the determining the at least one piece of depth information according to a set policy may be: randomly determining the at least one piece of depth information within a set range. Reference can be made to the corresponding description in the embodiment shown in FIG. 4 for determination of the plurality of pieces of depth information, which is not repeated herein.

S320: Present the verification information at the plurality of corresponding presentation depths according to the plurality of pieces of depth information.

In this embodiment of this application, the verification information may be presented in a manner the same as that described in the embodiment shown in FIG. 4. As the verification information comprises a plurality of image elements, different from the embodiment shown in FIG. 4, in this embodiment of this application, the plurality of image elements may be simultaneously presented at different presentation depths respectively, or the plurality of image elements may be presented at the plurality of corresponding presentation depths in a set time sequence.

In one example embodiment, description is given by using an example that the verification information is presented by using a projection display module of smart glasses. As shown in FIG. 3, an XOY plane is a plane in which an eye of a user is located, a value on OZ indicates a value of a depth from the eye, and the verification information comprises elements "2", "+" and "1", respectively corresponding to depths of d3, d2 and d1 relative to the eye of the user. In one example embodiment, when the verification information is presented, a presentation device adjusts a presentation parameter thereof in the set time sequence, to cause the element "2" to be presented at the depth of d3, the presentation parameter is further adjusted after a set time interval (for example, 1 second), to cause the element "+" to be presented at the depth of d2, and finally, in a similar way, the element "1" is presented at the depth of d1.

In one example embodiment, in order to further increase security of the verification information, when the verification information is presented, image elements of the verification information are presented in a set time sequence and at a random time interval. Herein, the random time interval is generally random within a set time interval range, for example, random within a range of (0, 2) seconds. For example, in this example embodiment, the element "2" is presented first, after a random time interval, for example, 0.5 second, the element "+" is presented, and after a random time interval, for example, 1.2 seconds, the element "1" is presented. With such random time intervals, the verification information is more difficult to be cracked by a machine, thereby improving security.

S330: Obtain verification input information in response to a verification input operation corresponding to the verification information.

S340: Compare the verification input information with a reference verification result, to determine whether the biometric authentication succeeds.

In this embodiment of this application, specific implementation of steps S330 and S340 is the same as that of steps S230 and S240 in the embodiment shown in FIG. 4, which is not repeated herein.

In one scenario, for example, while wearing a near-eye presentation device, a user may access a webpage displayed on a display screen of another user equipment (for example, a mobile phone or a computer), at this time, for example, corresponding verification information and corresponding depth information may be acquired by using the another user equipment, but the near-eye presentation device presents verification information corresponding to the depth information, and then the another user equipment obtains verification input information corresponding to the verification information to perform the biometric authentication.

Figure 6:
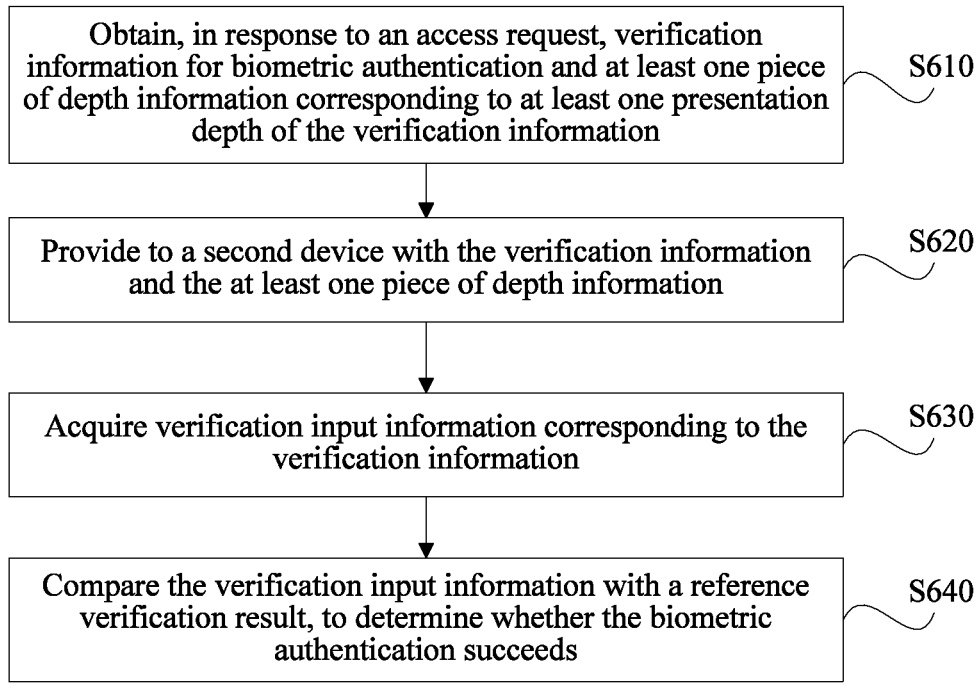
FIG. 6 is a schematic flowchart of a biometric authentication method according to an example embodiment of this application.

Therefore, as shown in FIG. 6, an embodiment of this application further provides a biometric authentication method, comprising:

S610: Obtain, in response to an access request, verification information for biometric authentication and at least one piece of depth information corresponding to at least one presentation depth of the verification information.

S620: Provide to a second device with the verification information and the at least one piece of depth information.

S630: Acquire verification input information corresponding to the verification information.

S640: Compare the verification input information with a reference verification result, to determine whether the biometric authentication succeeds.

For example, a second biometric authentication apparatus provided in this application serves as an execution body in this embodiment, to perform S610 to S640. Specifically, the second biometric authentication apparatus may be disposed in a user equipment through software, hardware or a combination thereof, or the second biometric authentication apparatus is the user equipment; the user equipment comprises, but is not limited to: smart phones, a computer, a tablet computer and other intelligent devices with a display capability. Like the embodiment shown in FIG. 1, in this embodiment of this application, the user is a user of the user equipment. In this embodiment of this application, the second device, for example, may be smart glasses, a smart helmet or other near-eye presentation devices, and the user is also a user of the second device.

According to this embodiment of this application, verification information for biometric authentication and corresponding depth information are sent to a corresponding second device to be presented at a corresponding depth, and whether the biometric authentication succeeds is determined by determining whether corresponding verification input information is consistent with a reference verification result, thereby improving accuracy of authentication and security of object access.

Like the embodiment shown in FIG. 1, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 1, FIG. 4 or FIG. 5 for details.

In this embodiment of this application, specific implementation of step S610 and step S640 is the same as that of the corresponding steps in the embodiment shown in FIG. 1, FIG. 4 or FIG. 5, only simple description is given below, and reference can be made to description about the corresponding steps in FIG. 1, FIG. 4 or FIG. 5 for details.

For step S610, the at least one piece of depth information can be determined according to a set policy.

Optionally, the determining the at least one piece of depth information according to a set policy comprises: randomly determining the at least one piece of depth information within a set range.

For step S620, the step may be performed through communication with the second device in a wired or wireless communication manner. For example, in step S620, the verification information and the at least one piece of depth information may be sent to the second device.

For step S630, the verification input information can be obtained in response to a verification input operation corresponding to the verification information. Reference can be made to the corresponding description in the embodiment shown in FIG. 4 for details.

Alternatively, optionally, in step S630, the verification input information may also be acquired from the second device. For example, the verification input information provided by the second device is received through communication with the second device.

After the comparison in step S640, the biometric authentication can be completed, so as to determine whether the access is initiated by the user or a non-human user.

Reference can be made to the description about the corresponding steps in the embodiments shown in FIG. 1 to FIG. 5 for the steps in this embodiment of this application, which are not repeated herein.

Certainly, it can be known by those skilled in the art that, in another example embodiment, the execution body of the biometric authentication method in this embodiment of this application may also be a part of a server.

Figure 7:
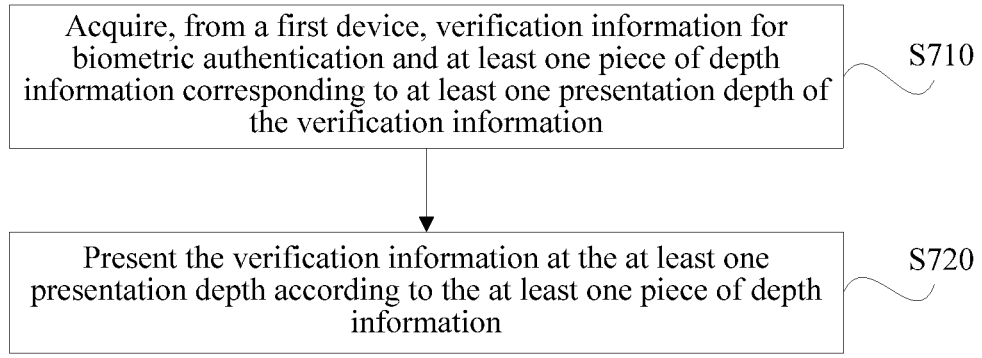
FIG. 7 is a schematic flowchart of a biometric authentication method according to an example embodiment of this application.

Based on the forgoing scenario, as shown in FIG. 7, an embodiment of this application further provides a biometric authentication method, comprising:

S710: Acquire, from a first device, verification information for biometric authentication and at least one piece of depth information corresponding to at least one presentation depth of the verification information.

S720: Present the verification information at the at least one presentation depth according to the at least one piece of depth information.

For example, a third biometric authentication apparatus provided in this application serves as an execution body in this embodiment, to perform S710 to S720. Specifically, the third biometric authentication apparatus may be disposed in a user equipment through software, hardware or a combination thereof, or the third biometric authentication apparatus is the user equipment; the user equipment comprises, but is not limited to: smart glasses, a smart helmet and other near-eye presentation devices, wherein the smart glasses comprise smart frame glasses and smart contact lenses. In this embodiment of this application, the user is a user of the user equipment, for example, when the user equipment is smart glasses, the user is a user wearing the smart glasses.

According to this embodiment of this application, after corresponding verification information and depth information are acquired from a first device, the verification information is presented at a corresponding presentation depth, to cause a user to see the verification information and perform a corresponding verification input operation and enable the first device to determine whether the biometric authentication succeeds by determining whether corresponding verification input information is consistent with a reference verification result, thereby improving accuracy of authentication and security of object access.

Like the embodiment shown in FIG. 1, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 1, FIG. 4 or FIG. 5 for details.

In this embodiment of this application, in step S710, the verification information and the depth information are acquired from the first device through communication with the first device. The communication may be wired communication or wireless communication.

Reference can be made to the corresponding description in step S120, S220 or S320 for presentation of the verification information in step S720, which is not repeated herein.

In one example embodiment of this application, the method further comprises:
    obtaining verification input information in response to a verification input operation corresponding to the verification information; and
    providing to the first device with the verification input information.

For example, when the execution body of the method of this embodiment of this application is a pair of smart glasses, the verification information can be obtained by using an input module of the smart glasses such as a gaze tracking, voice control or touch panel input module, and then is provided to the first device, for example, the verification information is sent to the first device by using a communications module. Reference can be made to the corresponding description in the embodiment shown in FIG. 4 or FIG. 5 for the method for obtaining the verification input information in this embodiment of this application, which is not repeated herein.

Reference can be made to the description about the corresponding steps in the embodiments shown in FIG. 1 to FIG. 5 for the steps in this embodiment of this application, which are not repeated herein.

It should be understood by those skilled in the art that, sequence numbers of the steps do not mean execution sequences in the methods in the specific example embodiments of this application. The execution sequences of the steps should be determined according to functions and internal logic of the steps, and should not be construed as any limitation to the implementation processes of the specific example embodiments of this application.

Figure 8:
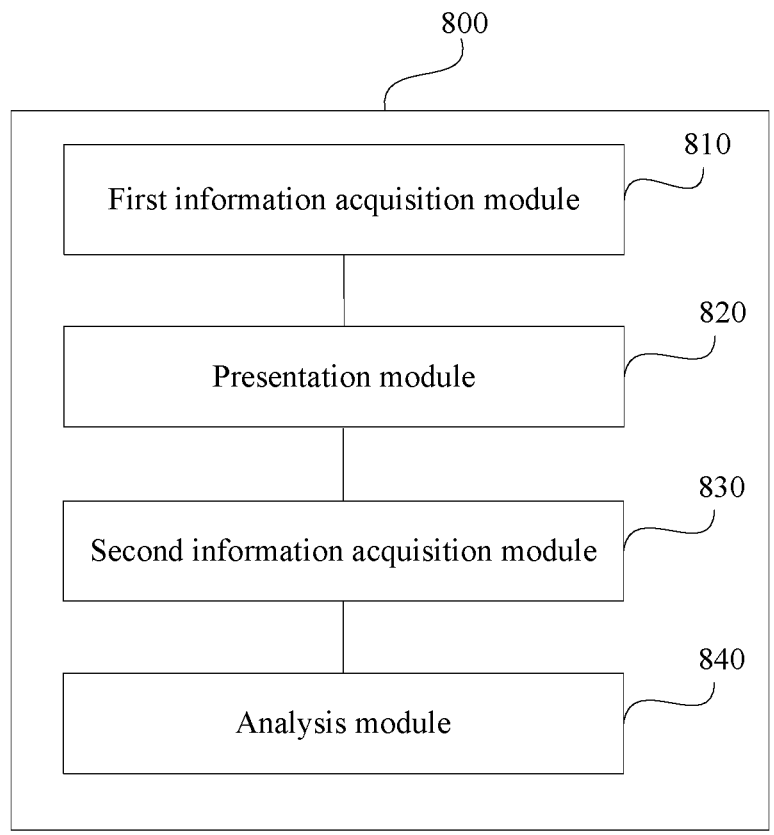
FIG. 8 is a schematic structural block diagram of a first biometric authentication apparatus according to an example embodiment of this application.

As shown in FIG. 8, an embodiment of this application provides a first biometric authentication apparatus 800, comprising:
- a first information acquisition module 810, configured to obtain, in response to an access request, verification information for biometric authentication and at least one piece of depth information corresponding to at least one presentation depth of the verification information;
- a presentation module 820, configured to present the verification information at the at least one presentation depth according to the at least one piece of depth information;
- a second information acquisition module 830, configured to obtain verification input information in response to a verification input operation corresponding to the verification information; and
- an analysis module 840, configured to compare the verification input information with a reference verification result, to determine whether the biometric authentication succeeds.

In this embodiment, the at least one presentation depth is at least one depth of at least one presentation position of the verification information relative to a reference position; the reference position herein may be a viewing position, for example, an eye of a user; or may be a position of a presentation component, for example, a position of a lens of smart glasses. This embodiment of this application is described below by using an example that the reference position is an eye of a user.

According to this embodiment of this application, verification information for biometric authentication is presented at a depth corresponding to the verification information, and whether the biometric authentication succeeds is determined by determining whether corresponding verification input information is consistent with a reference verification result, thereby improving accuracy of authentication and security of object access.

In one example embodiment of this application, as shown in FIG. 2, the verification information may be presented at a same presentation depth as a whole. At this time, the at least one piece of depth information is one piece of depth information.

Alternatively, in another example embodiment of this application, the verification information may comprise a plurality of image elements, wherein a presentation depth corresponding to at least one image element is different from presentation depths corresponding to other image element(s). As shown in FIG. 3, the plurality of image elements corresponds to a plurality of presentation depths. At this time, the at least one piece of depth information is a plurality of pieces of depth information corresponding to a plurality of presentation depths.

Modules of the first biometric authentication apparatus in this embodiment of this application are further described below respectively.

Figure 9:
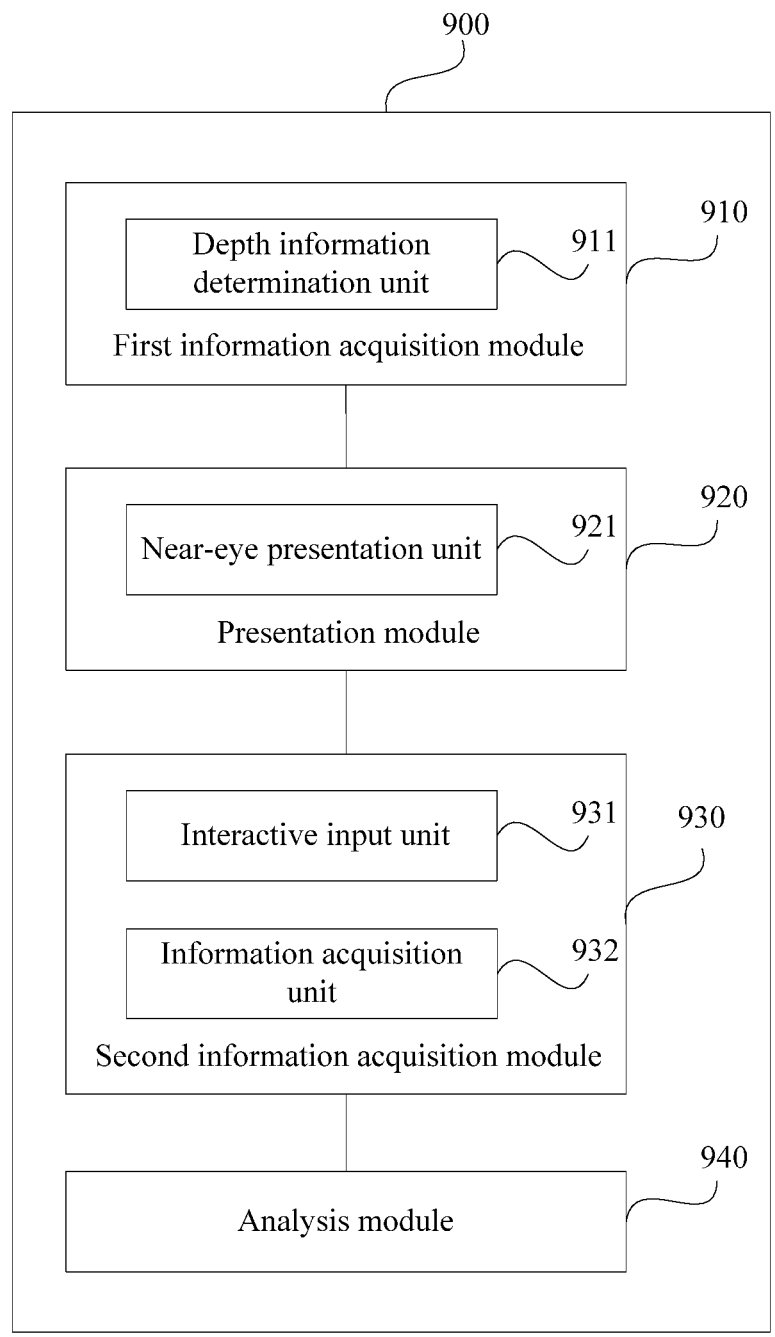
FIG. 9 is a schematic structural block diagram of a first biometric authentication apparatus according to an example embodiment of this application.

As shown in FIG. 9, when the verification information is presented at a same presentation depth, a first biometric authentication apparatus 900 comprises:
- a first information acquisition module 910, configured to obtain, in response to an access request, verification information for biometric authentication and depth information corresponding to a presentation depth of the verification information;
- a presentation module 920, configured to present the verification information at the presentation depth according to the depth information;
- a second information acquisition module 930, configured to obtain verification input information in response to a verification input operation corresponding to the verification information; and
- an analysis module 940, configured to compare the verification input information with a reference verification result, to determine whether the biometric authentication succeeds.

In this embodiment of this application, the verification information may comprise: a word or number with a meaning, or a pattern with no particular meaning, as long as it can be presented and seen by a user. The verification information may be obtained from an external server, for example, when the access request is an access request for a webpage, the verification information can be acquired from a server corresponding to the webpage.

In this embodiment of this application, in order to improve security of biometric authentication, depth information respectively corresponding to a plurality of verification information corresponding to a plurality of access requests should not be exactly the same.

Therefore, in this implementation manner, optionally, the first information acquisition module 910 comprises:
- a depth information determination unit 911, configured to determine the at least one piece of depth information according to a set policy.

In one example embodiment, optionally, the depth information determination unit 911 is further configured to:
- randomly determine the at least one piece of depth information within a set range.

Reference can be made to the corresponding description in the embodiment shown in FIG. 4 for implementation of functions of the first information acquisition module 910 and the unit thereof, which is not repeated herein.

In one example embodiment of this application, the presentation module 920 may comprise a near-eye presentation unit 921, configured to present the verification information through near-eye presentation. The near-eye presentation unit 921 is a unit configured to be worn near an eye of a user and present an image to the user. For example, the near-eye presentation unit 921 may be a projection display unit of a pair of smart glasses, and information can be presented at different presentation depths by adjusting a parameter of the near-eye presentation unit 921 (for example, adjusting a parameter such as a focal length of a lens subunit in the near-eye presentation unit 921).

In one example embodiment, the second information acquisition module 930 may comprise an interactive input unit 931 and an information acquisition unit 932:

The interactive input unit 931 is configured to be used by the user to perform a verification input operation corresponding to the verification information.

In this embodiment of this application, after the verification information is presented at the presentation depth by using the presentation module 920, if the access request is initiated by a user, the user sees the verification information presented at the corresponding presentation depth and performs input corresponding to the verification information. The interactive input unit 931 is configured to be used by the user to perform the verification input operation. For example, the interactive input unit 931 may be: a touch screen, a mouse, a keyboard, a microphone or an eye control unit. The user can perform the corresponding verification input operation by using the interactive input unit 931.

The information acquisition unit 932 is configured to obtain verification input information in response to the verification input operation of the user.

In this embodiment of this application, the verification information may be a simple arithmetic question or a recognition question, the user can obtain a corresponding answer according to the verification information, the verification input operation is generally used to input the answer, and the verification input information is related to the answer input by the user. In this embodiment of this application, the analysis module 940 may compare the verification input information with the reference verification result to determine whether the answer input by the user is the same as the reference verification result, if yes, determine that the biometric authentication succeeds, and otherwise, determine that the biometric authentication fails.

Figure 10:
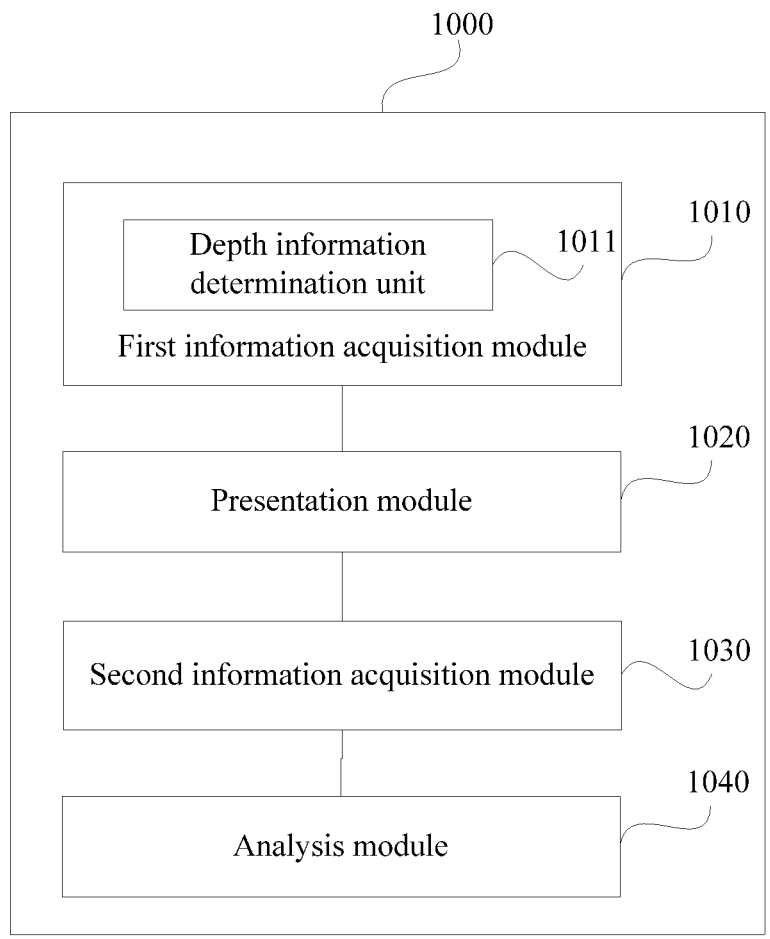
FIG. 10 is a schematic structural block diagram of a first biometric authentication apparatus according to an example embodiment of this application.

As shown in FIG. 10, when the verification information comprises a plurality of image elements, a first biometric authentication apparatus 1000 comprises:

- a first information acquisition module 1010, configured to obtain, in response to an access request, verification information for biometric authentication and a plurality of pieces of depth information corresponding to a plurality of presentation depths of a plurality of image elements of the verification information, wherein in the plurality of image elements, at least one image element and other image element(s) respectively correspond to different depth information in the plurality of pieces of depth information;
- a presentation module 1020, configured to present the verification information at the plurality of corresponding presentation depths according to the plurality of pieces of depth information;
- a second information acquisition module 1030, configured to obtain verification input information in response to a verification input operation corresponding to the verification information; and
- an analysis module 1040, configured to compare the verification input information with a reference verification result, to determine whether the biometric authentication succeeds.

As shown in FIG. 3, in one example embodiment, in the plurality of image elements, a presentation depth of each image element is different from that of another image element. Certainly, in other example embodiments of this embodiment of this application, presentation depths of some image elements may be the same.

Similar to the embodiment shown in FIG. 9, in this embodiment of this application, optionally, the first information acquisition module 1010 comprises:

- a depth information determination unit 1011, configured to determine the plurality of pieces of depth information according to a set policy.

In one example embodiment, optionally, the depth information determination unit 1011 is further configured to:

- randomly determine the plurality of pieces of depth information within a set range.

Reference can be made to the corresponding description in the embodiment shown in FIG. 4 for implementation of functions of the first information acquisition module 1010 and the unit thereof, which is not repeated herein.

In this embodiment of this application, the structure of the presentation module 1020 may be the same as that of the presentation module 920 in the embodiment shown in FIG. 9. However, as the verification information comprises a plurality of image elements, different from the embodiment shown in FIG. 9, in this embodiment of this application, the presentation module 1020 may be configured to simultaneously present the plurality of image elements at different presentation depths respectively, for example, different image elements are imaged respectively in different regions by using an imaging module with an adjustable imaging parameter in each region; or may be configured to present the plurality of image elements at the plurality of corresponding presentation depths in a set time sequence. Reference can be made to the corresponding description in the embodiments shown in FIG. 5, FIG. 3 and FIG. 9 for details.

In this implementation manner, the structure of the second information acquisition module 1030 may be the same as that of the second information acquisition module 930 in the embodiment shown in FIG. 9, which is not repeated herein.

In one example embodiment, when the plurality of image elements is presented in the set time sequence, the verification input information acquired by the second information acquisition module 1030 may further comprise sequence information corresponding to a presentation sequence of the plurality of image elements.

When the analysis module 940 performs comparison to determine whether the verification input information is consistent with the reference verification result, in addition to analyzing whether the content is consistent, analyzing whether an input sequence corresponding to the verification input information is consistent with the sequence information comprised in the reference verification result may be further comprised.

Figure 11:
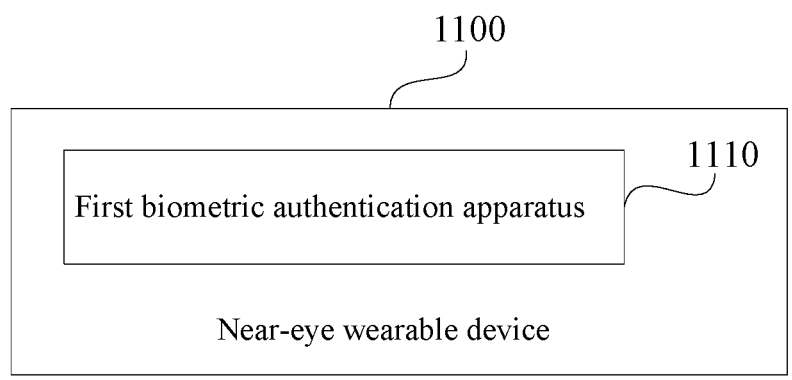
FIG. 11 is a schematic structural block diagram of a near-eye wearable device according to an example embodiment of this application.

As shown in FIG. 11, an embodiment of this application further discloses a near-eye wearable device 1100, comprising the first biometric authentication apparatus 1110 in any one of FIG. 8 to FIG. 10.

In one example embodiment, the near-eye wearable device 1100 is smart glasses or a smart helmet.

Figure 12:
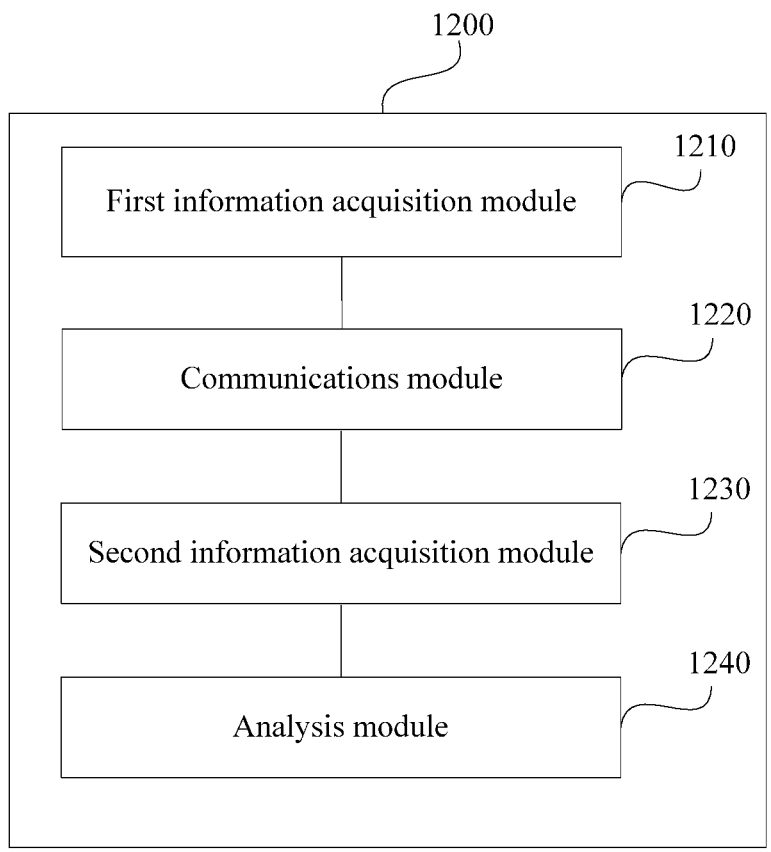
FIG. 12 is a schematic structural block diagram of a second biometric authentication apparatus according to an example embodiment of this application.

As shown in FIG. 12, an embodiment of this application further discloses a second biometric authentication apparatus 1200, comprising:

- a first information acquisition module 1210, configured to obtain, in response to an access request, verification information for biometric authentication and at least one piece of depth information corresponding to at least one presentation depth of the verification information;
- a communications module 1220, configured to provide to a second device with the verification information and the at least one piece of depth information;
- a second information acquisition module 1230, configured to acquire verification input information corresponding to the verification information; and
- an analysis module 1240, configured to compare the verification input information with a reference verification result, to determine whether the biometric authentication succeeds.

In this embodiment of this application, the second device, for example, may be smart glasses, a smart helmet or other near-eye presentation devices.

According to this embodiment of this application, verification information for biometric authentication and corresponding depth information are sent to a corresponding second device to be presented at a corresponding depth, and whether the biometric authentication succeeds is determined by determining whether corresponding verification input information is consistent with a reference verification result, thereby improving accuracy of authentication and security of object access.

Like the embodiment shown in FIG. 8, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 8, FIG. 9 or FIG. 10 for details.

In this embodiment of this application, structures and functions of the first information acquisition module 1210 and the analysis module 1240 are the same as those of the first information acquisition module and the analysis module in the embodiment shown in FIG. 9 or FIG. 10, which are not repeated herein.

In this embodiment of this application, the communications module 1220 may be a wired communications module or a wireless communications module, configured to perform communication and data and signal transmission with the second device.

Figure 12A:
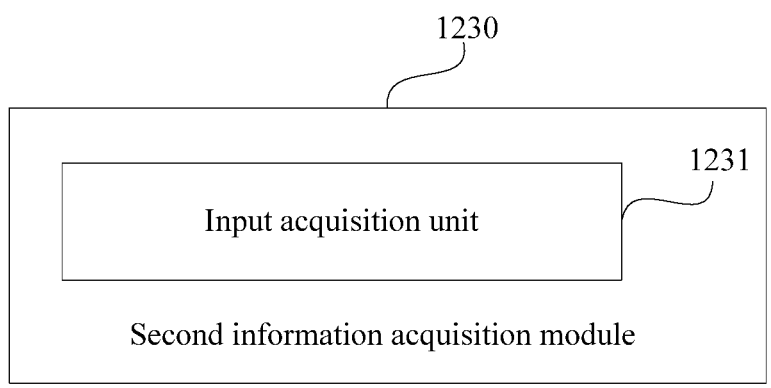
FIG. 12a and FIG. 12b are schematic structural block diagrams of two types of second information acquisition modules of a second biometric authentication apparatus according to an example embodiment of this application.

As shown in FIG. 12*a*, in one example embodiment of this application, the second information acquisition module 1230 comprises:

an input acquisition unit 1231, configured to obtain the verification input information in response to a verification input operation corresponding to the verification information.

The function of the input acquisition unit 1231 is the same as that of the second information acquisition module 930 shown in FIG. 9 or FIG. 10, which is not repeated herein.

Figure 12B:
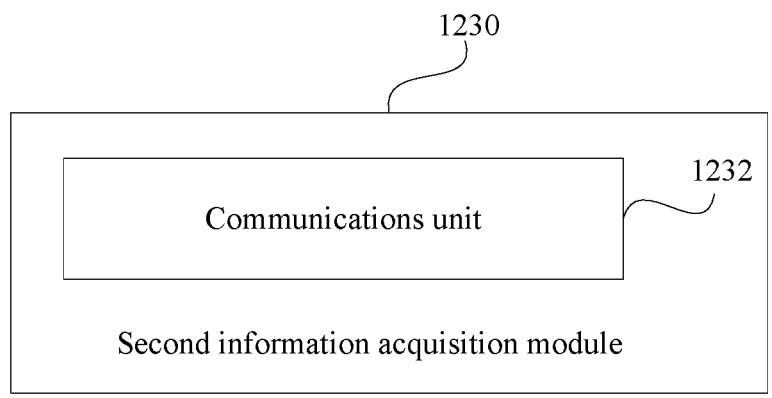

As shown in FIG. 12*b*, in another example embodiment, the second information acquisition module 1230 comprises:

a communications unit 1232, configured to acquire the verification input information from the second device.

Reference can be made to the corresponding description in the embodiment shown in FIG. 6, FIG. 8, FIG. 9 or FIG. 10 for implementation of the functions of the modules in this embodiment of this application, which is not repeated herein.

Figure 13:
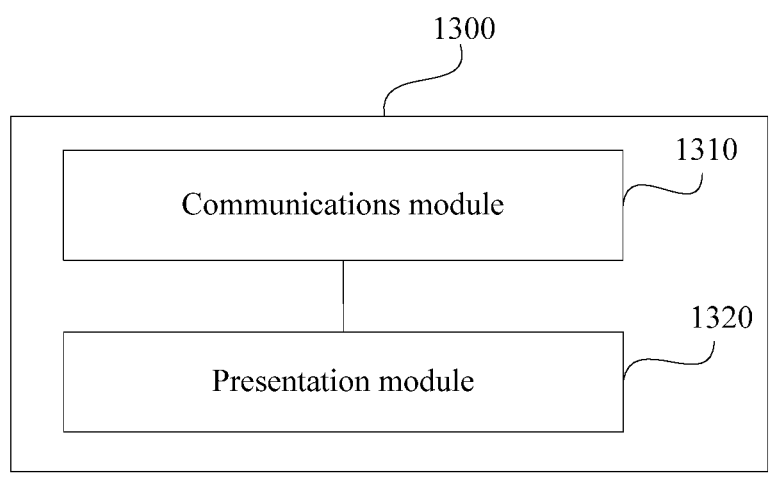
FIG. 13 is a schematic structural block diagram of a third biometric authentication apparatus according to an example embodiment of this application.

As shown in FIG. 13, an embodiment of this application discloses a third biometric authentication apparatus 1300, comprising:

a communications module 1310, configured to acquire, from a first device, verification information for biometric authentication and at least one piece of depth information corresponding to at least one presentation depth of the verification information; and a presentation module 1320, configured to present the verification information at the at least one presentation depth according to the at least one piece of depth information.

According to this embodiment of this application, after corresponding verification information and depth information are acquired from a first device, the verification information is presented at a corresponding presentation depth, to cause a user to see the verification information and further enable the first device to determine whether the biometric authentication succeeds by determining whether corresponding verification input information is consistent with a reference verification result, thereby improving accuracy of authentication and security of object access.

Like the embodiment shown in FIG. 8, in this embodiment of this application, the verification information may correspond to a same presentation depth as a whole, or may comprise a plurality of image elements and correspond to a plurality of different presentation depths, that is, the verification information comprises a plurality of image elements, and the at least one piece of depth information is a plurality of pieces of depth information corresponding to a plurality of presentation depths; and in the plurality of image elements, at least one image element and other image element(s) respectively correspond to different depth information in the plurality of pieces of depth information. Reference can be made to the corresponding description in FIG. 8, FIG. 9 or FIG. 10 for details.

In this embodiment of this application, the structure and function of the presentation module 1320 are the same as those of the corresponding presentation module in the embodiment shown in FIG. 9 or FIG. 10, which are not repeated herein.

In this embodiment of this application, the communications module 1310 may be a wired communications module or a wireless communications module, configured to perform communication and data and signal transmission with the second device.

Figure 13A:
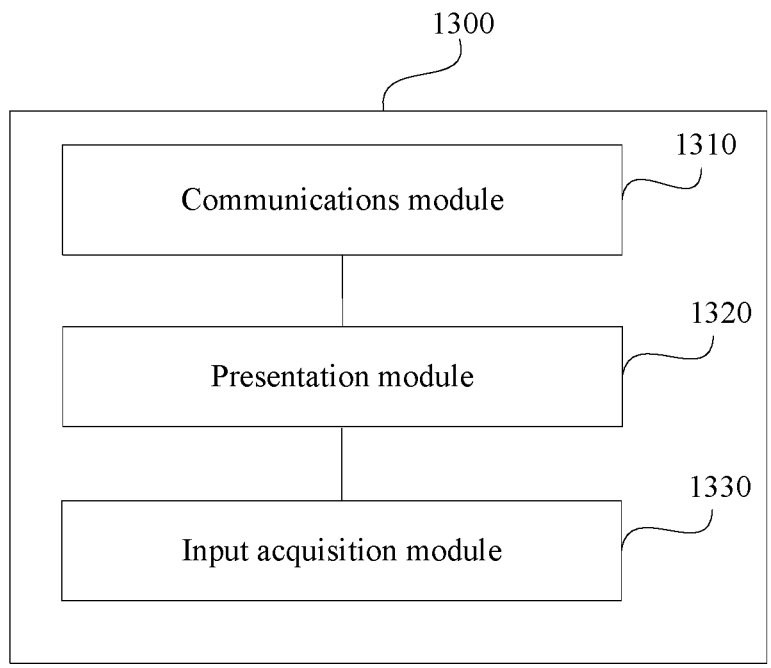
FIG. 13a is a schematic structural block diagram of a third biometric authentication apparatus according to an example embodiment of this application.

As shown in FIG. 13*a*, in one example embodiment of this application, the apparatus 1300 may further comprise:

an input acquisition module 1330, configured to obtain verification input information in response to a verification input operation corresponding to the verification information; and the communications module 1310 is further configured to provide to the first device with the verification input information.

In this implementation manner, the function of the input acquisition module 1330 is the same as that of the second information acquisition module 930 shown in FIG. 9 or FIG. 10, which is not repeated herein.

Reference can be made to the corresponding description in the embodiment shown in FIG. 7, FIG. 8, FIG. 9 or FIG. 10 for implementation of the functions of the modules in this embodiment of this application, which is not repeated herein.

Figure 14:
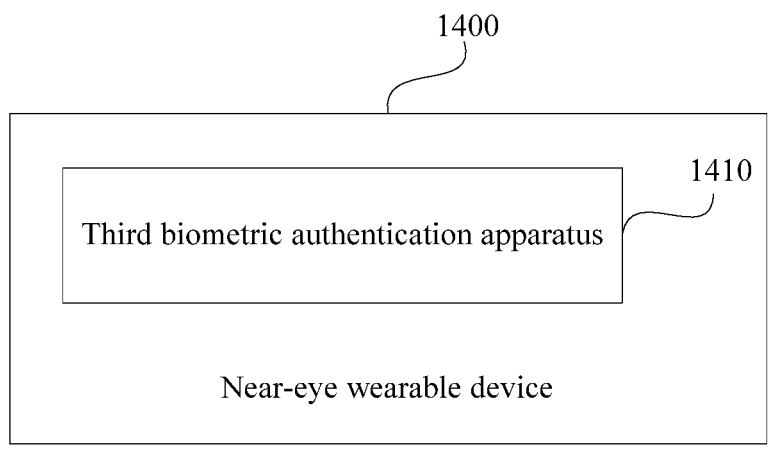
FIG. 14 is a schematic structural block diagram of a near-eye wearable device according to an example embodiment of this application.

As shown in FIG. 14, an embodiment of this application provides a near-eye wearable device 1400, comprising the third biometric authentication apparatus 1410 in the embodiment shown in FIG. 13.

Figure 15:
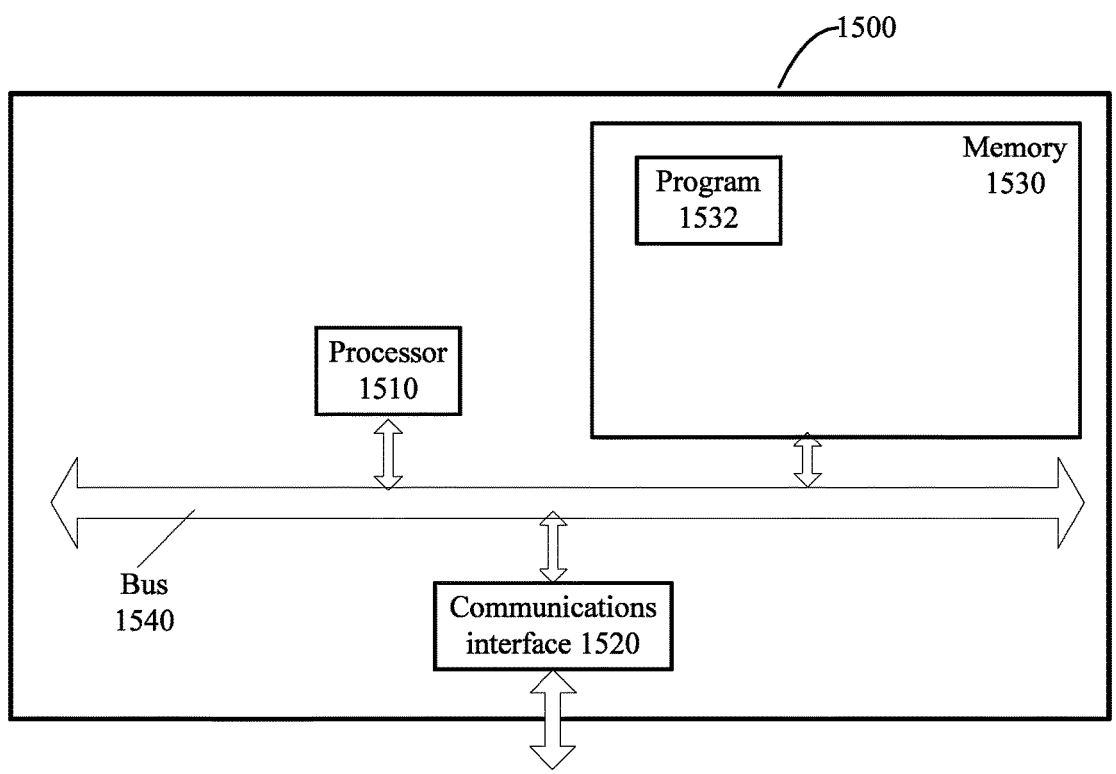
FIG. 15 is a schematic structural block diagram of a biometric authentication apparatus according to an example embodiment of this application.

FIG. 15 is a schematic structural diagram of still another biometric authentication apparatus 1500 according to an embodiment of this application. The specific embodiment of this application sets no limitations to specific implementation of the biometric authentication apparatus 1500. As shown in FIG. 15, the biometric authentication apparatus 1500 may comprise:

a processor 1510, a communications interface 1520, a memory 1530, and a communications bus 1540.

The processor 1510, the communications interface 1520, and the memory 1530 perform mutual communication via the communications bus 1540.

The communications interface 1520 is configured to communicate with a network element such as a client.

The processor 1510 is configured to execute a program 1532, and specifically, can implement relevant steps in the method embodiments.

Specifically, the program 1532 may comprise program code, and the program code comprises a computer operation instruction.

The processor 1510 may be a central processing unit (CPU), or an application specific integrated circuit (ASIC), or be configured to be one or more integrated circuits that implement the embodiments of this application.

The memory 1530 is configured to store the program 1532. The memory 1530 may comprise a high-speed RAM memory, and may also comprise a non-volatile memory, for example, at least one disk memory.

In one example embodiment, the program 1532 may be specifically used to enable the biometric authentication apparatus 1500 to perform the following steps:

obtaining, in response to an access request, verification information for biometric authentication and at least one piece of depth information corresponding to at least one presentation depth of the verification information;

presenting the verification information at the at least one presentation depth according to the at least one piece of depth information;

obtaining verification input information in response to a verification input operation corresponding to the verification information; and comparing the verification input information with a reference verification result, to determine whether the biometric authentication succeeds.

In another example embodiment, the program 1532 may be specifically used to enable the biometric authentication apparatus 1500 to perform the following steps:

obtaining, in response to an access request, verification information for biometric authentication and at least one piece of depth information corresponding to at least one presentation depth of the verification information;

providing to a second device with the verification information and the at least one piece of depth information;

acquiring verification input information corresponding to the verification information; and comparing the verification input information with a reference verification result, to determine whether the biometric authentication succeeds.

In still another example embodiment, the program 1532 may be specifically used to enable the biometric authentication apparatus 1500 to perform the following steps:

acquiring, from a first device, verification information for biometric authentication and at least one piece of depth information corresponding to at least one presentation depth of the verification information; and presenting the verification information at the at least one presentation depth according to the at least one piece of depth information.

Reference can be made to the corresponding description of the corresponding steps and units in the foregoing embodiments for specific implementation of the steps in the program 1532, which is not repeated herein. Those skilled in the art can clearly understand that, for the purpose of convenient and brief description, for detailed working processes of the foregoing devices and modules, reference can be made to the corresponding processes in the foregoing method embodiments, and details are not repeated herein.

A person of ordinary skill in the art may be aware that, in combination with the examples described in the embodiments disclosed in this specification, units and method steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of this application.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of this application. The foregoing storage medium comprises: a USB flash drive, a removable hard disk, a read-only memory (ROM), a random access memory (RAM), a magnetic disk, an optical disc or any other medium that can be configured to store program code.

The above implementations are only intended to describe this application rather than to limit this application. Various changes and variations can be made by those of ordinary skill in the art without departing from the spirit and scope of this application. Therefore, all equivalent technical solutions also belong to the category of this application, and the scope of patent protection of this application should be defined by the claims.

What is claimed is:

1. A biometric authentication method, comprising:

obtaining, by a system comprising a processor in response to an access request, verification information for biometric authentication and at least one piece of depth information corresponding to at least one presentation depth of the verification information, wherein the verification information comprises a plurality of image elements, and a presentation depth of each of the plurality of image elements is different from that of another image element in the plurality of image elements;

presenting the verification information at the at least one presentation depth according to the at least one piece of depth information;

obtaining verification input information in response to a verification input operation corresponding to the verification information; and comparing the verification input information with a reference verification result, to determine whether the biometric authentication succeeds.

2. The method of claim 1, wherein the verification information comprises image elements, and the at least one piece of depth information comprises pieces of depth information corresponding to presentation depths.

3. The method of claim 1, wherein the obtaining the at least one piece of depth information comprises:

determining the at least one piece of depth information according to a set policy.

4. The method of claim 3, wherein the determining the at least one piece of depth information according to the set policy comprises:

randomly determining the at least one piece of depth information within a set range.

5. The method of claim 2, wherein the presenting the verification information at the at least one presentation depth according to the at least one piece of depth information comprises:

presenting the image elements at the corresponding presentation depths according to the pieces of depth information.

6. The method of claim 5, wherein the presenting the image elements at the corresponding presentation depths comprises:

presenting the image elements at the corresponding presentation depths in a set time sequence.

7. The method of claim 6, wherein the presenting the image elements at the corresponding presentation depths in the set time sequence comprises:
presenting the image elements at the corresponding presentation depths in the set time sequence and at a random time interval.

8. The method of claim 1, wherein the verification information is presented through near-eye presentation.

9. A method, comprising:
obtaining, by a system comprising a processor in response to an access request, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements;
providing to a second device with the verification information and the piece of depth information;
acquiring verification input information corresponding to the verification information; and
comparing the verification input information with a reference verification result, to determine whether the biometric authentication has succeeded.

10. The method of claim 9, wherein the verification information comprises image elements, and the piece of depth information comprises pieces of depth information corresponding to presentation depths.

11. The method of claim 9, wherein the obtaining the piece of depth information comprises:
determining the piece of depth information according to a set policy.

12. The method of claim 9, wherein the acquiring the verification input information corresponding to the verification information comprises:
obtaining the verification input information in response to a verification input operation corresponding to the verification information.

13. The method of claim 9, wherein the acquiring the verification input information corresponding to the verification information comprises:
acquiring the verification input information from the second device.

14. A method, comprising:
acquiring, by a system comprising a processor from a first device, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements; and
presenting the verification information at the presentation depth according to the piece of depth information.

15. The method of claim 14, wherein the verification information comprises a plurality of image elements, and the piece of depth information comprises a plurality of pieces of depth information corresponding to a plurality of presentation depths.

16. The method of claim 15, wherein the presenting the verification information at the presentation depth according to the piece of depth information comprises:
presenting the plurality of image elements at the plurality of corresponding presentation depths according to the plurality of pieces of depth information.

17. The method of claim 16, wherein the presenting the plurality of image elements at the plurality of corresponding presentation depths comprises:
presenting the plurality of image elements at the plurality of corresponding presentation depths in a set time sequence.

18. The method of claim 17, wherein the presenting the plurality of image elements at the plurality of corresponding presentation depths in the set time sequence comprises:
presenting the plurality of image elements at the plurality of corresponding presentation depths in the set time sequence and at a random time interval.

19. The method of claim 14, wherein the verification information is presented through near-eye presentation.

20. The method of claim 14, further comprising:
obtaining verification input information in response to a verification input operation corresponding to the verification information; and
providing to the first device with the verification input information.

21. An apparatus, comprising:
a memory that stores executable modules; and
a processor, coupled to the memory, that executes or facilitates execution of the executable modules, comprising:
a first information acquisition module configured to obtain, in response to an access request, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements;
a presentation module configured to present the verification information at the presentation depth according to the piece of depth information;
a second information acquisition module configured to obtain verification input information in response to a verification input operation corresponding to the verification information; and
an analysis module configured to compare the verification input information with a reference verification result, to determine whether the biometric authentication succeeds.

22. The apparatus of claim 21, wherein the first information acquisition module is further configured to:
obtain the verification information comprising a plurality of image elements and a plurality of pieces of depth information corresponding to a plurality of presentation depths.

23. The apparatus of claim 21, wherein the first information acquisition module comprises:
a depth information determination unit configured to determine the piece of depth information according to a set policy.

24. The apparatus of claim 23, wherein the depth information determination unit is further configured to:
randomly determine the piece of depth information within a set range.

25. The apparatus of claim 22, wherein the presentation module is further configured to:

present the plurality of image elements at the plurality of corresponding presentation depths according to the plurality of pieces of depth information.

26. The apparatus of claim 25, wherein the presentation module is further configured to:
present the plurality of image elements at the plurality of corresponding presentation depths in a set time sequence.

27. The apparatus of claim 26, wherein the presentation module is further configured to:
present the plurality of image elements at the plurality of corresponding presentation depths in the set time sequence and at a random time interval.

28. The apparatus of claim 21, wherein the presentation module comprises a near-eye presentation unit configured to present the verification information through near-eye presentation.

29. A near-eye wearable device, comprising the biometric authentication apparatus of claim 21.

30. An apparatus, comprising:
a memory that stores executable modules; and
a processor, coupled to the memory, that executes or facilitates execution of the executable modules, comprising:
a first information acquisition module configured to obtain, in response to an access request, verification information for biometric authentication and at least one piece of depth information corresponding to at least one presentation depth of the verification information, wherein the verification information comprises a plurality of image elements, and a presentation depth of each of the plurality of image elements is different from that of another image element in the plurality of image elements;
a communications module configured to provide to a second device with the verification information and the at least one piece of depth information;
a second information acquisition module configured to acquire verification input information corresponding to the verification information; and
an analysis module configured to compare the verification input information with a reference verification result, to determine whether the biometric authentication succeeds.

31. The apparatus of claim 30, wherein the first information acquisition module is further configured to:
obtain the verification information comprising image elements and pieces of depth information corresponding to presentation depths.

32. The apparatus of claim 30, wherein the first information acquisition module comprises:
a depth information determination unit configured to determine the at least one piece of depth information according to a set policy.

33. The apparatus of claim 32, wherein the depth information determination unit is further configured to:
randomly determine the at least one piece of depth information within a set range.

34. The apparatus of claim 30, wherein the second information acquisition module comprises:
an input acquisition unit configured to obtain the verification input information in response to a verification input operation corresponding to the verification information.

35. The apparatus of claim 30, wherein the second information acquisition module comprises:

a communications unit configured to acquire the verification input information from the second device.

36. An apparatus, comprising:
a memory that stores executable modules; and
a processor, coupled to the memory, that executes or facilitates execution of the executable modules, comprising:
a communications module configured to acquire, from a first device, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements; and
a presentation module, configured to present the verification information at the presentation depth according to the piece of depth information.

37. The apparatus of claim 36, wherein the communications module is further configured to acquire, from the first device, the verification information comprising image elements and pieces of depth information corresponding to presentation depths.

38. The apparatus of claim 37, wherein the presentation module is further configured to:
present the image elements at the corresponding presentation depths according to the pieces of depth information.

39. The apparatus of claim 38, wherein the presentation module is further configured to:
present the image elements at the corresponding presentation depths in a set time sequence.

40. The apparatus of claim 39, wherein the presentation module is further configured to:
present the image elements at the corresponding presentation depths in the set time sequence and at a random time interval.

41. The apparatus of claim 36, wherein the presentation module comprises a near-eye presentation unit configured to present the verification information through near-eye presentation.

42. The apparatus of claim 36, wherein the executable modules further comprise:
an input acquisition module configured to obtain verification input information in response to a verification input operation corresponding to the verification information; and
the communications module is further configured to provide to the first device with the verification input information.

43. A near-eye wearable device, comprising the biometric authentication apparatus of claim 36.

44. A computer readable storage device comprising executable instructions that, in response to execution, cause a device comprising a processor to perform operations, comprising:
obtaining, in response to an access request, verification information for biometric authentication and at least one piece of depth information corresponding to at least one presentation depth of the verification information, wherein the verification information comprises a plurality of image elements, and a presentation depth of each of the plurality of image elements is different from that of another image element in the plurality of image elements;

presenting the verification information at the at least one presentation depth according to the at least one piece of depth information;

obtaining verification input information in response to a verification input operation corresponding to the verification information; and comparing the verification input information with a reference verification result, to determine whether the biometric authentication has succeeded.

45. A computer readable storage device comprising executable instructions that, in response to execution, cause a device comprising a processor to perform operations, comprising:

obtaining, in response to an access request, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements;

providing to a second device with the verification information and the piece of depth information;

acquiring verification input information corresponding to the verification information; and comparing the verification input information with a reference verification result, to determine whether the biometric authentication succeeds.

46. A computer readable storage device comprising executable instructions that, in response to execution, cause a device comprising a processor to perform operations, comprising:

acquiring, from a first device, verification information for biometric authentication and a piece of depth information corresponding to a presentation depth of the verification information, wherein the verification information comprises a plurality of image elements, and a presentation depth of each of the plurality of image elements is different from that of another image element in the plurality of image elements; and presenting the verification information at the at least one presentation depth according to the at least one piece of depth information.

* * * * *